United States Patent

[11] 3,537,524

| [72] | Inventor | James M. McMillen<br>Arlington, Texas |
|---|---|---|
| [21] | Appl. No. | 812,351 |
| [22] | Filed | April 1, 1969 |
| [45] | Patented | Nov. 3, 1970 |
| [73] | Assignee | Mobil Oil Corporation<br>a corporation of New York |

[54] METHOD OF TREATING A SUBTERRANEAN CLAY-CONTAINING FORMATION
5 Claims, No Drawings

[52] U.S. Cl. ..................................................... 166/305
[51] Int. Cl. ........................................................ E21b 43/25
[50] Field of Search........................................... 116/305, 306, 304, 279, 263; 252/8.55B,C,D

[56] References Cited
UNITED STATES PATENTS

| 3,064,732 | 11/1962 | Bernard et al. | 166/305 |
| 3,131,759 | 5/1964 | Slusser et al. | 166/305 |
| 3,236,306 | 2/1966 | Atwood | 166/305 |
| 3,286,770 | 11/1966 | Knox et al. | 166/305 |
| 3,288,215 | 11/1966 | Townsend et al. | 166/305 |
| 3,301,327 | 1/1967 | Patton et al. | 166/205 |
| 3,349,032 | 10/1967 | Krieg | 166/275 |
| 3,389,750 | 6/1968 | Bohor et al. | 166/305 |
| 3,422,890 | 1/1969 | Darley | 166/305X |

*Primary Examiner*—Stephen J. Novosad
*Attorneys*—William J. Scherback, Frederick E. Dumoulin, William D. Jackson, Andrew L. Gaboriault and Sidney A. Johnson ABSTRACT: This specification discloses a method of treating a subterranean formation penetrated by a well in order to make hydratable clays within the formation preferentially oil-wettable. A nonaqueous water-miscible solvent such as a low molecular weight aliphatic alcohol is injected into the formation in order to reduce the water saturation thereof adjacent the well. Thereafter, a nonaqueous carrier liquid containing an oil-wetting surfactant is injected into the formation. The carrier liquid has mutual miscibility with the previously injected solvent such that the solvent is displaced and the surfactant is deposited within the formation adjacent the well. A gas may be injected intermediate the solvent and the carrier liquid in order to displace the previously injected solvent and to dry the formation.

3,537,524

METHOD OF TREATING A SUBTERRANEAN CLAY-CONTAINING FORMATION

BACKGROUND OF THE INVENTION

This invention relates to the treatment of subterranean formations containing hydratable clays.

It is oftentimes desirable to treat a subterranean formation in order to make the formation resistant to the damaging effects of water. For example, in the petroleum industry it is a conventional practice to inject water into an oil-bearing formation in order to displace the oil to a production well. Such formations often contain hydratable clays, particularly those of the kaolinite and montmorillonite groups, which undergo swelling and/or dispersion in the presence of water with a resultant decrease in the permeability of the formation. In order to alleviate the problems of water damage due to the presence of hydratable clays within the formation it heretofore has been proposed to treat such formations with oil-wetting surfactants which render the formation surfaces preferentially oil-wettable. These surfactants thus act in effect as waterproofing agents. Because of the radial flow geometry attendant to the flow of fluids between a well in a subterranean formation, water damage to the formation normally is of serious consequence only in the first few feet of the formation next to the well. Accordingly, it is necessary only to treat that portion of the formation next adjacent the well in question.

For an example of particular prior art techniques employed for stabilizing hydratable clays, reference is made to U.S. Pat. No. 3,389,750 to Bohor et al. This patent discloses a water-flooding process in which the initially injected water contains an ethenoxylated tertiary diamine, a potassium salt such as potassium chloride, and an imidazoline such as 1-hydroxyethyl-2-heptadecyl imidazoline. Another prior art technique is disclosed in U.S. Pat. No. 2,761,838 to Brown et al. In this procedure, substituted ammonium salts derived from p-phenylenediamine or substituted p-phenylenediamines are employed to stabilize clays such as are encountered in subterranean oil formations, railroad or highway cuts, road beds, etc. In this process, the surface active agent may be employed by dissolving it in any suitable polar solvent such as water, methyl alcohol, ethyl alcohol, etc.

SUMMARY OF THE INVENTION

In accordance with the present invention there is provided a new and improved process of treating a subterranean formation adjacent a well in order to make the formation clays preferentially oil-wettable such that the water sensitivity of the formation is reduced. In carrying out the invention, a nonaqueous water-miscible solvent is injected into the formation through the well. Thereafter, a nonaqueous carrier liquid which is miscible with the solvent and which contains an oil-wetting surfactant is injected through the well and into the formation. The first step of injecting the solvent displaces water from the formation and thereby reduces the water saturation of the formation adjacent the well. This creates an environment in which the subsequently injected surfactant is readily adsorbed onto the exposed formation surfaces.

In a preferred embodiment of the invention, a gas is injected immediately after the nonaqueous water-miscible solvent. This displaces the solvent and further decreases any remaining residual water saturation, thus further enhancing adsorption of the subsequently injected surfactant.

DESCRIPTION OF THE PREFERRED EMBODIMENTS

The solvent employed in the first step of the invention functions to displace formation water deeper into the formation away from the well thereby reducing the water saturation immediately adjacent the well. Thus, the subsequently injected oil-wetting surfactant contacts the formation in a substantially nonaqueous environment such that the surfactant has direct and ready access to the clay surfaces and effectively provides a water-resistant coating.

The solvent employed may be any suitable liquid which is miscible with water but which is itself nonaqueous. Examples of solvents for use in the present invention are alcohols and other various water-miscible organic liquids such as ketones, ethers and glycols. The various low molecular weight aliphatic alcohols are particularly useful in the invention since they are readily available and exhibit a high miscibility with water as well as with oil in the formation. Examples of such alcohols are methyl alcohol, ethyl alcohol, propyl alcohol, isopropyl alcohol, tertiary butyl alcohol, isobutyl alcohol, and allyl alcohol. Other materials which may be usefully employed as solvents in the present invention include ethylene glycol, butylene glycol, ethylene glycol monomethyl ether, ethylene glycol monobutyl ether, acetone, and ethyl methyl ketone.

Since clay swelling and dispersion is a serious problem primarily in the portion of the formation immediately adjacent the well, the formation water need be displaced in the formation only a limited distance from the well. It usually will be desirable to inject the water-miscible solvent in an amount sufficient to occupy the first 10 to 20 feet of the formation next to the wellbore. Greater amounts may be injected if desired. However, in most cases injection of the solvent in amounts greater than the formation pore volume within a radius of 30 feet surrounding the wellbore will not provide significant additional benefits.

Subsequent to the solvent injection step, an oil-wetting surfactant is introduced into the formation. the oil-wetting surfactant may be any surface active agent which has oleophilic characteristics and which upon adsorption on the exposed clay surfaces within the formation causes such surfaces to be preferentially oil-wettable, i.e., more readily wetted by oil than by water. As the surfactant is adsorbed onto the formation surfaces, it forms a film in which the oleophilic hydrocarbon groups are directed outwardly away from the solid surfaces of the formation. Thus, the surfactant renders the exposed surfaces within the formation water resistant.

The surfactant utilized in the present invention may be any agent or a mixture of several compatible agents which renders the contacted formation surfaces preferentially oil-wettable. The surfactants which have been found to be particularly suitable for use in the invention are the higher alkyl quaternary ammonium salts which have one or more long-chain alkyl groups. Typically these alkyl quaternary ammonium salts take the form of alkyl trimethyl ammonium chlorides or a dialkyl dimethyl ammonium chloride in which the alkyl groups have a carbon chain length within the range of about 8 to 18. An example of these alkyl quaternary ammonium salts is Arquad T-2C, which is a n-alkyl trimethyl ammonium chloride available from Armour Chemical Company. Other suitable oil-wetting surfactants are aliphatic polyethenoxy tertiary amines in which the aliphatic group contains from 12 to 18 carbon atoms. These agents are available from the Armour Chemical Company under the trade name of Ethomeen. Examples of specific agents are Ethomeen C/12, Ethomeen 18/12, and Ethomeen S/12. Further oil-wetting surfactants which may be used in the invention are ethenoxylated tertiary diamines which are available from the Armour Chemical Company under the trade name Ethoduomeen. It will be recognized that the above designated surface active agents are exemplary only and that other suitable oil-wetting surfactants may be utilized in carrying out the invention.

The oil-wetting surfactant is injected into the formation as a dispersion or solute in a nonaqueous carrier liquid which is miscible with the previously injected solvent. Thus, the solvent is effectively displaced further into the formation ahead of the carrier liquid. This tends to restrict dispersion of the surface active agent between the carrier liquid and the solvent, thus retarding the dilution of the surfactant concentration in the carrier liquid and keeping the concentration of the surfactant in the carrier liquid at a relatively high level. This promotes the adsorption of the surfactant onto the formation surfaces while restricting the tendency of the surfactant to be desorbed back into the carrier liquid. Thus, an adequate amount of the oil-wetting surfactant is deposited in the formation immediately adjacent the well where it is most needed.

The carrier liquid may be any suitable liquid which is miscible with the solvent and capable of solubilizing or dispersing the oil-wetting surfactant. Examples of suitable carrier liquids are alcohols, ethers, ketones, and glycols such as those described above. In addition, the carrier liquid may be an oleaginous liquid such as petroleum crude oil or diesel oil. The carrier liquid may be the same as the previously injected solvent. In this case, the invention can be practiced by first injecting the water-miscible liquid free of surfactant and, after a sufficient amount has been injected to displace the water as desired, injecting additional liquid while increasing the concentration of the oil-wetting surfactant to the desired level.

In a preferred embodiment of the invention, a gas is injected into the formation after the water-miscible solvent but before the injection of the carrier liquid containing the oil-wetting surfactant. The injection of gas in accordance with this embodiment of the invention displaces the previously injected solvent and in addition tends to "dry" the formation immediately adjacent the well, thus decreasing any residual water saturation which may remain after injection of the solvent. By further reducing the liquid content of the formation immediately adjacent the well prior to the injection of the carrier liquid and surfactant, conditions favoring a relatively high surfactant concentration in the carrier liquid and adsorption of the surfactant onto the formation surfaces are advanced. While any suitable gas may be utilized in this step of the invention, air is preferred since it is readily available and effectively absorbs moisture from the formation surfaces.

To further aid those skilled in the art in the practice of the invention, reference is made to the following experimental test. The test was carried out in a pack formed of desegregated sand from cores taken from an oil-bearing sandstone. The sand pack contained about 14 percent silt and clays comprised predominantly of kaolin and montmorillonite.

The sand pack was first flooded with a 1.4 percent aqueous solution of sodium chloride. After about 3 pore volumes of the sodium chloride solution had passed through the pack, it reached an equilibrium permeability of about 16.5 millidarcies. Thereafter, a 0.35 percent sodium chloride solution was injected in an amount sufficient to invade about 10 percent of the pack. The overall permeability of the pack was reduced to 3 to 4 millidarcies and the invaded portion of the pack was estimated to have permeability of about 0.5 millidarcy. The pack was then flushed with methanol. Thereafter, dry air was passed through the pack followed by additional methanol. The pack was then flooded with a 3 percent by volume solution of Arquad T-26 in isopropanol.

Following introduction of the oil-wetting surfactant, the pack was flooded with about 10 pore volumes of a 0.7 percent sodium chloride solution followed by a 0.35 percent sodium chloride solution. The permeability was found to be 218 millidarcies. Thereafter, the sodium chloride solution was displaced with distilled water. After 3 days, the permeability was 137 millidarcies.

I claim:

1. In the treatment of a subterranean formation penetrated by a well and containing hydratable clays, the method of reducing the water sensitivity of said formation adjacent said well comprising the steps of:
   a. injecting into said formation through said well a nonaqueous water-miscible solvent whereby the water saturation of said formation is reduced adjacent said well; and
   b. Thereafter injecting into said formation through said well an oil-wetting surfactant contained in a nonaqueous carrier liquid having mutual miscibility with said solvent.

2. The method of claim 1 wherein said solvent comprises an aliphatic alcohol.

3. The method of claim 1 wherein said oil-wetting surfactant is a quaternary ammonium salt.

4. The method of claim 1 further comprising the step of injecting a gas through said well and into said formation subsequent to the injection of said nonaqueous solvent and prior to the injection of said oil-wetting surfactant.

5. The method of claim 4 wherein said gas is air.